(12) United States Patent
Kooima et al.

(10) Patent No.: US 11,044,852 B2
(45) Date of Patent: Jun. 29, 2021

(54) AGRICULTURAL KNIFE WITH PRIMARY AND SECONDARY SERRATIONS

(71) Applicant: KOOIMA COMPANY, Rock Valley, IA (US)

(72) Inventors: Phil Kooima, Rock Valley, IA (US); Nolan Den Boer, Rock Valley, IA (US); Zachary T. Pramann, Beresford, SD (US)

(73) Assignee: Kooima Ag, Inc., Rock Valley, IA (US)

( * ) Notice: Subject to any disclaimer, the term of this patent is extended or adjusted under 35 U.S.C. 154(b) by 139 days.

(21) Appl. No.: 16/417,806

(22) Filed: May 21, 2019

(65) Prior Publication Data

US 2020/0368752 A1 Nov. 26, 2020

(51) Int. Cl.
*A01F 29/00* (2006.01)
*A01K 5/00* (2006.01)
*B02C 18/18* (2006.01)

(52) U.S. Cl.
CPC ............ *A01F 29/005* (2013.01); *A01K 5/001* (2013.01); *B02C 18/18* (2013.01)

(58) Field of Classification Search
CPC ......... B02C 18/00; B02C 18/06; B02C 18/16; B02C 18/18; A01K 5/00; A01F 29/005; A01F 29/06; A01F 29/025; A01F 29/10
USPC .................... 241/261.1, 292.1, 605
See application file for complete search history.

(56) References Cited

U.S. PATENT DOCUMENTS

| | | |
|---|---|---|
| 276,951 A | 5/1883 | Baker |
| 386,183 A * | 7/1888 | Brooks ..................... B26B 9/02 30/355 |
| 1,408,850 A | 3/1922 | Webb |
| 1,929,838 A | 10/1933 | Crane |
| 2,183,114 A | 12/1939 | Bonapace |
| 2,867,137 A | 1/1959 | Joy |

(Continued)

FOREIGN PATENT DOCUMENTS

WO WO-2018035611 A1 * 3/2018 ........... A01F 29/005

OTHER PUBLICATIONS

J. Arnold and R. Volz; "Laser Powder Technology for Cladding and Welding"; Journal of Thermal Spray Technology, pp. 243-248,vol. 8(2) Jun. 1999.

(Continued)

*Primary Examiner* — Adam J Eiseman
*Assistant Examiner* — Matthew Stephens
(74) *Attorney, Agent, or Firm* — Jeffrey A. Proehl; Woods, Fuller, Shultz & Smith, P.C.

(57) ABSTRACT

A knife with a serrated cutting edge may include a plate having a leading edge forming a plurality of teeth seats arranged in a stepped configuration, with each of the plurality of teeth seats. The knife may also include a plurality of elongate cutting elements each affixed to one of the teeth seats formed by the leading edge. The cutting elements may form a portion of the serrated cutting edge, and each may have a top surface and a bottom surface. The cutting edge may be on the top surface and the bottom surface may be affixed to one of the teeth seats. The serrated cutting edge has a plurality of primary serrations and a plurality of secondary serrations, with each of the cutting elements forming at least one of the primary serrations and at least one of the secondary serrations.

17 Claims, 13 Drawing Sheets

(56) References Cited

U.S. PATENT DOCUMENTS

| | | | | |
|---|---|---|---|---|
| 2,934,120 | A | 4/1960 | Schnell | |
| 3,022,621 | A | 2/1962 | Zavarella | |
| 3,635,271 | A | 1/1972 | Markham | |
| 3,851,450 | A | 12/1974 | Nelson | |
| 4,068,688 | A | 1/1978 | Benson | |
| 4,198,006 | A | 4/1980 | Rolfe | |
| 4,205,564 | A | 6/1980 | Kolb | |
| 4,205,797 | A | 6/1980 | Bennett, Jr. | |
| 4,357,817 | A | 11/1982 | Linsinger | |
| 4,376,793 | A | 3/1983 | Jackson | |
| 4,428,260 | A | 1/1984 | Eby | |
| 4,506,839 | A | 3/1985 | Black | |
| 4,563,867 | A | 1/1986 | Bokon | |
| 4,615,734 | A | 10/1986 | Spriggs | |
| 4,690,024 | A | 9/1987 | Chaconas | |
| 4,719,743 | A | 1/1988 | Bokon | |
| 4,724,299 | A | 2/1988 | Hammeke | |
| 4,760,967 | A | 8/1988 | Bendickson | |
| 4,770,253 | A | 9/1988 | Hallissy | |
| 4,802,396 | A | 2/1989 | Kuklinski | |
| 4,896,424 | A | 6/1990 | Walker | |
| 5,020,918 | A | 6/1991 | Faccia | |
| 5,027,592 | A | 7/1991 | Wieneke | |
| 5,074,623 | A | 12/1991 | Hedlund | |
| 5,082,188 | A | 1/1992 | Urich | |
| 5,160,822 | A | 11/1992 | Aleshin | |
| 5,193,280 | A | 3/1993 | Jackson | |
| 5,331,876 | A | 7/1994 | Hayden, Sr. | |
| 5,351,595 | A | 10/1994 | Johnston | |
| 5,427,000 | A | 6/1995 | Hellbergh | |
| 5,456,416 | A | 10/1995 | Hartwig | |
| 5,553,937 | A | 9/1996 | Faccia | |
| 5,590,963 | A * | 1/1997 | Schuler | B01F 7/00208 366/302 |
| 5,613,537 | A | 3/1997 | Gassiott | |
| 5,615,839 | A | 4/1997 | Hartwig | |
| 5,622,638 | A | 4/1997 | Schell | |
| 5,647,665 | A | 7/1997 | Schuler | |
| 5,772,131 | A | 6/1998 | Dal Maso | |
| 5,823,449 | A * | 10/1998 | Kooima | B01F 7/00008 241/27 |
| 5,884,465 | A | 3/1999 | Ibach | |
| 5,979,152 | A | 11/1999 | McCredie | |
| 5,997,248 | A | 12/1999 | Ghasripoor | |
| 6,000,649 | A | 12/1999 | Loppoli | |
| 6,092,750 | A | 7/2000 | Kooima | |
| 6,367,533 | B1 | 4/2002 | Pitzen | |
| 6,510,681 | B2 | 1/2003 | Yang | |
| 6,571,665 | B2 | 6/2003 | Julien | |
| 6,662,837 | B2 | 12/2003 | Smith | |
| 6,857,255 | B1 | 2/2005 | Wilkey | |
| 7,043,819 | B1 | 5/2006 | Arnold | |
| 7,104,883 | B2 | 9/2006 | Dow | |
| 7,124,567 | B1 | 10/2006 | Adamson | |
| 7,290,341 | B2 | 11/2007 | Kooima | |
| 7,537,419 | B2 | 5/2009 | Sjoberg | |
| 7,543,387 | B2 | 6/2009 | Legrand | |
| 7,644,568 | B2 | 1/2010 | Buchko | |
| 7,703,713 | B2 | 4/2010 | Smith | |
| 8,109,176 | B1 | 2/2012 | Kooima | |
| 8,186,611 | B1 * | 5/2012 | Boer | A01K 5/001 241/294 |
| 2006/0242845 | A1 | 11/2006 | Kooima | |
| 2007/0039445 | A1 | 2/2007 | Nitsch | |
| 2007/0261867 | A1 | 11/2007 | Techel | |
| 2010/0071216 | A1 | 3/2010 | Novak | |
| 2010/0325902 | A1 | 12/2010 | Dutta | |
| 2012/0325950 | A1 * | 12/2012 | Davis | B02C 18/0084 241/243 |
| 2014/0217222 | A1 * | 8/2014 | Greve | B02C 18/18 241/292.1 |
| 2016/0157423 | A1 * | 6/2016 | Stoffel | A01F 29/09 241/27 |
| 2016/0309648 | A1 * | 10/2016 | Stoffel | C21D 9/18 241/294 |

OTHER PUBLICATIONS

Steffen Nowotny et al., "Laser Beam Build-Up Welding: Precision in Repair, Surface Cladding, and Direct 3D Metal Deposition"; Journal of Thermal Spray Technology, pp. 344-348, vol. 16(3) Sep. 2007.

E. Schubert et al.; "Laser Beam Cladding: A Flexible Tool for Local Surface Treatment and Repair"; Journal of Thermal Spray Technology, pp. 590-596, vol. 8(4) Dec. 1999.

M. Lugbauer et al., "Thermal Sprayed Coatings in High-Performance Agricultural Machinery: Properties and Wear-Behaviour Test Routine", Proceedings of the 2006 International Spray Conference, pp. 1345-1350, May 2006.

Standard Mixer Knife, Kooima Company Product Catalog, download date Feb. 16, 2010, www.kooima.com.

Knife Backing Plate, Kooima Company Product Catalog, download date Feb. 16, 2010, www.kooima.com.

Kuhn North America, Vsl Vertical Maxx Single-Auger TMR Mixers, brochure, copyright 2009.

* cited by examiner

AGRICULTURAL KNIFE WITH PRIMARY AND SECONDARY SERRATIONS

BACKGROUND

Field

The present disclosure relates to agricultural knives and more particularly pertains to a new agricultural knife with primary and secondary serrations for facilitating the cutting and chopping of agricultural crop materials

SUMMARY

In one aspect, the present disclosure relates to a knife with a serrated cutting edge for use on an auger of an agricultural feed mixer, and the knife may comprise a plate having at least a leading edge forming a plurality of teeth seats arranged in a stepped configuration along the leading edge, with each of the plurality of teeth seats including a face edge surface and a back edge surface converging to form a notch. The knife may also include a plurality of elongate cutting elements, with each of the cutting elements being affixed to one of the teeth seats formed by the leading edge. Each of the cutting elements may form a portion of the serrated cutting edge, and each of the cutting elements may have a top surface and a bottom surface opposite of the top surface. The cutting edge may be located on the top surface and the bottom surface may be affixed to one of the teeth seats of the leading edge of the plate. The serrated cutting edge has a plurality of primary serrations and a plurality of secondary serrations, with each of the cutting elements forming at least one of the primary serrations and at least one of the secondary serrations.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 14 thereof, a new agricultural knife with primary 10 and secondary serrations embodying the principles and concepts of the disclosed subject matter will be described.

The applicants have recognized the benefit of providing a serrated cutting edge on an agricultural knife or blade used to cut agricultural crop materials such as, for example, in an agricultural feed mixer system disclosed in U.S. Pat. No. 5,823,449 which is hereby incorporated by reference in its entirety. In an agricultural feed mixer, the crop material, such as hay, may slide across the cutting edge of the knife from one end of the knife positioned toward the center of the auger of the agricultural mixer outwardly toward the outer end of the knife. Because the hay has a somewhat "springy" or flexibly resilient character, as the knife plows into the mass of hay, the springiness causes the hay stems or stalks to slide out and jump from knife tooth to knife tooth. This action helps to cut it as it jumps from one sharp point and impacts with the next sharp point, and is what makes knives with greater numbers of serrations cut hay more aggressively and effectively as compared to knives with relatively fewer serrations.

The applicants understand that the greater the number of serrations on a knife, the more effectively the knife is able to cut the crop materials. However, the degree to which the number of serrations can be increased in knives utilizing cutting elements (such as carbide inserts) has been limited due to the added complication of manufacturing a base plate of the knife with additional seats for the inserts, as well as the increased cost of materials required to form and attach additional cutting elements to the base plate, as well as other factors. These factors have thus limited the degree to which the cutting effectiveness of the knife could be increased by adding additional cutting elements to the knife.

To address this situation, the applicants have devised a knife in which the cutting elements or inserts affixed to the base plate each form a primary serration, and each of the cutting elements is provided with multiple (e.g., at least two) secondary serrations on the primary serration which permits an increase in the number of serrations on the cutting edge of a knife without needing to increase the number of cutting elements on the knife and thus needing to increase the number of inserts attached to the base plate. As an example, forming two secondary serrations on a cutting element which also forms a primary serration provides three different cutting edge sections on the cutting element as compared to the single cutting edge section provided when the cutting element provides only a primary serration.

The applicants have also determined that knives having serrations with only a single level or degree and uniform sizes tend to become plugged up with crop material and carry that material as the rotor rotates, and that the utilization of at least two levels or magnitudes of serrations provides enhanced impact with the crop materials with greater cutting effectiveness and less plugging of the knife.

Figure 1:
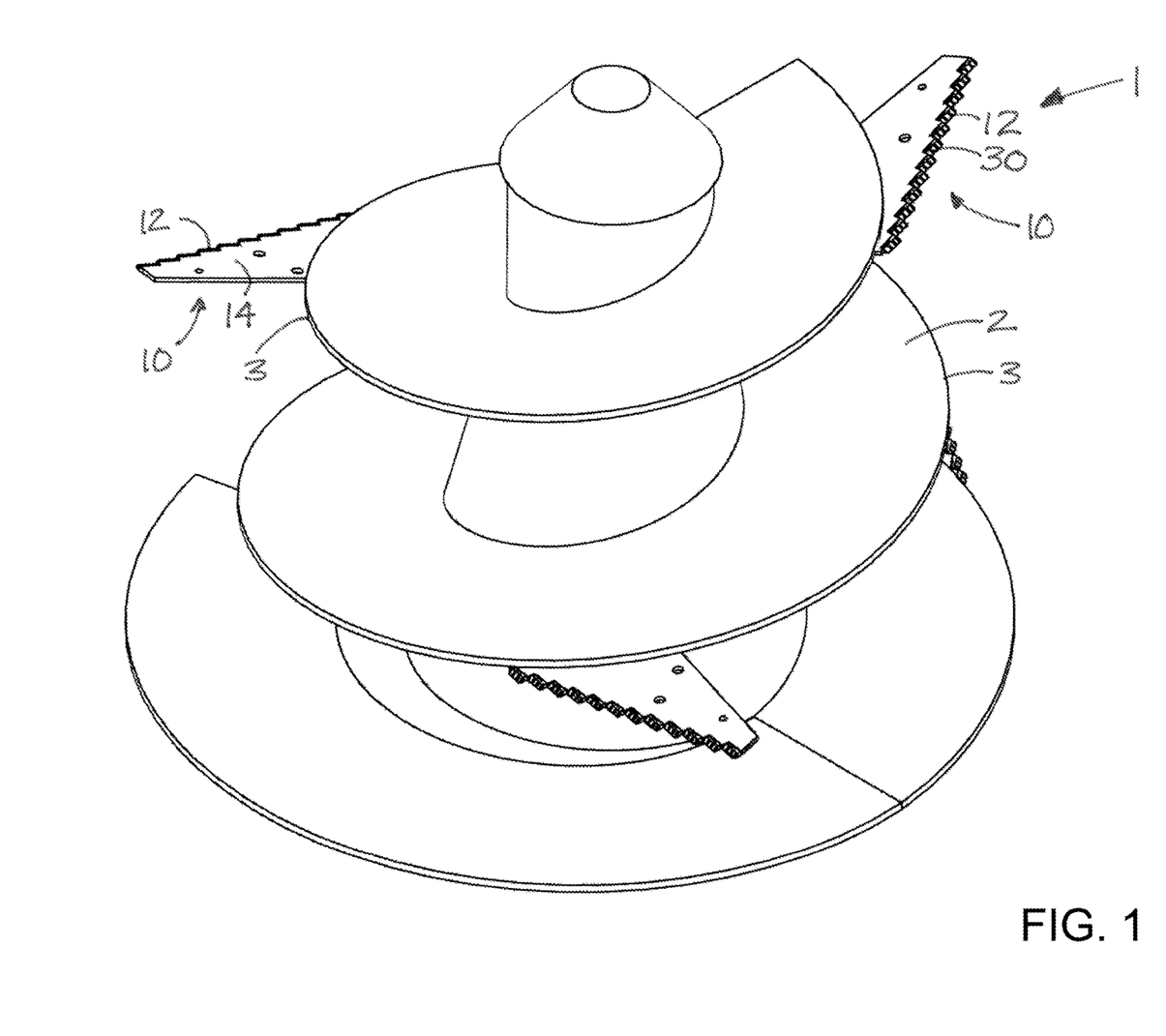
FIG. 1 is a schematic top view of an agricultural feed mixer with a new agricultural knife with primary and secondary serrations according to the present disclosure.

In one aspect, the disclosure relates to a knife 10 for use on an agricultural feed mixer 1 which typically has an auger 2 which rotates with in a bin that receives feed materials to be chopped and mixed. The knife 10 may form a serrated cutting edge 12, and the knife may be mountable to the auger of the feed mixer in a manner such that the cutting edge of the knife protrudes beyond a periphery 3 of the auger. In some embodiments, the auger has a helical shape and the periphery 3 is correspondingly helical in shape.

Figure 2:
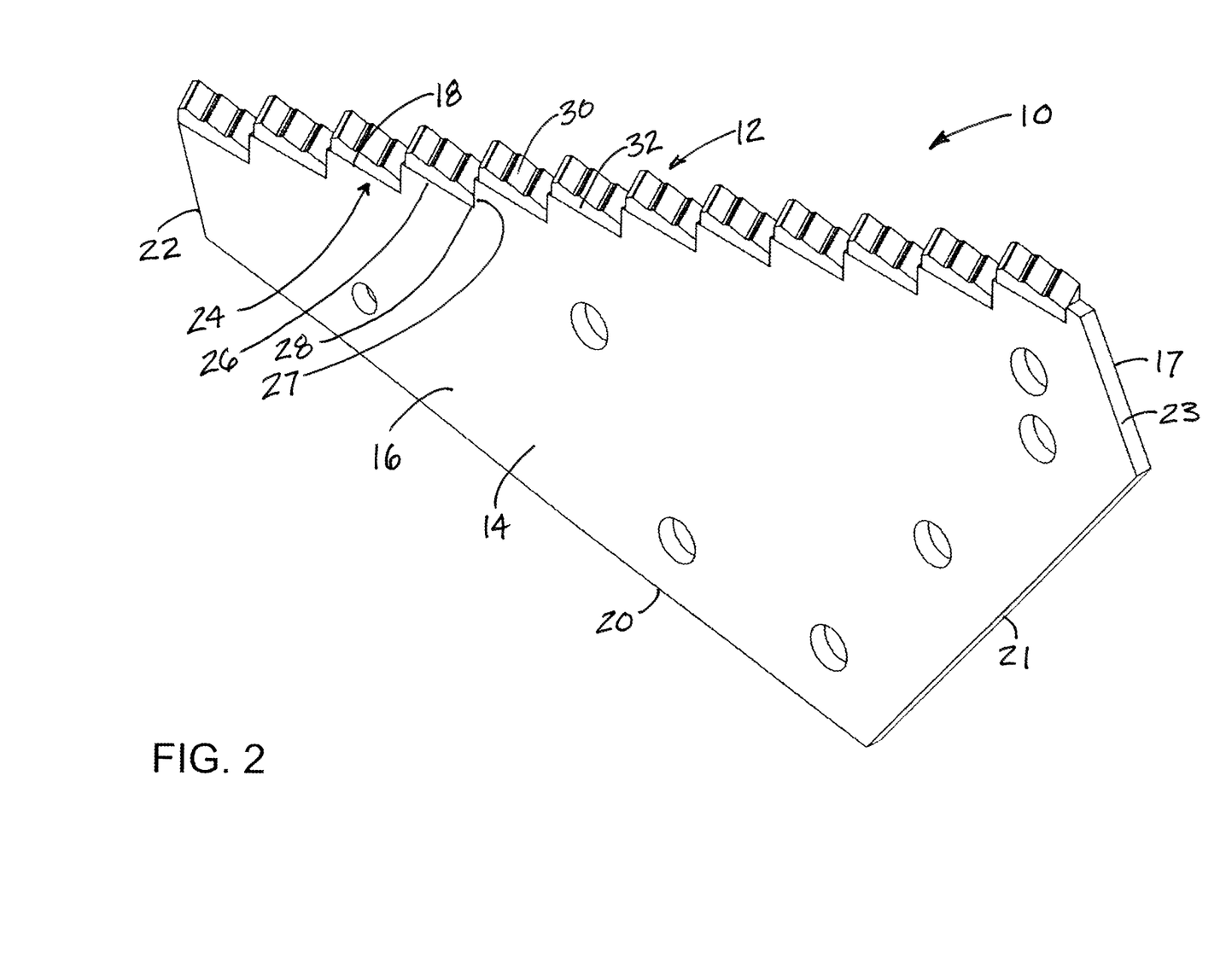
FIG. 2 is a schematic perspective view of the agricultural knife shown in FIG. 1, according to an illustrative embodiment.
Figure 3:
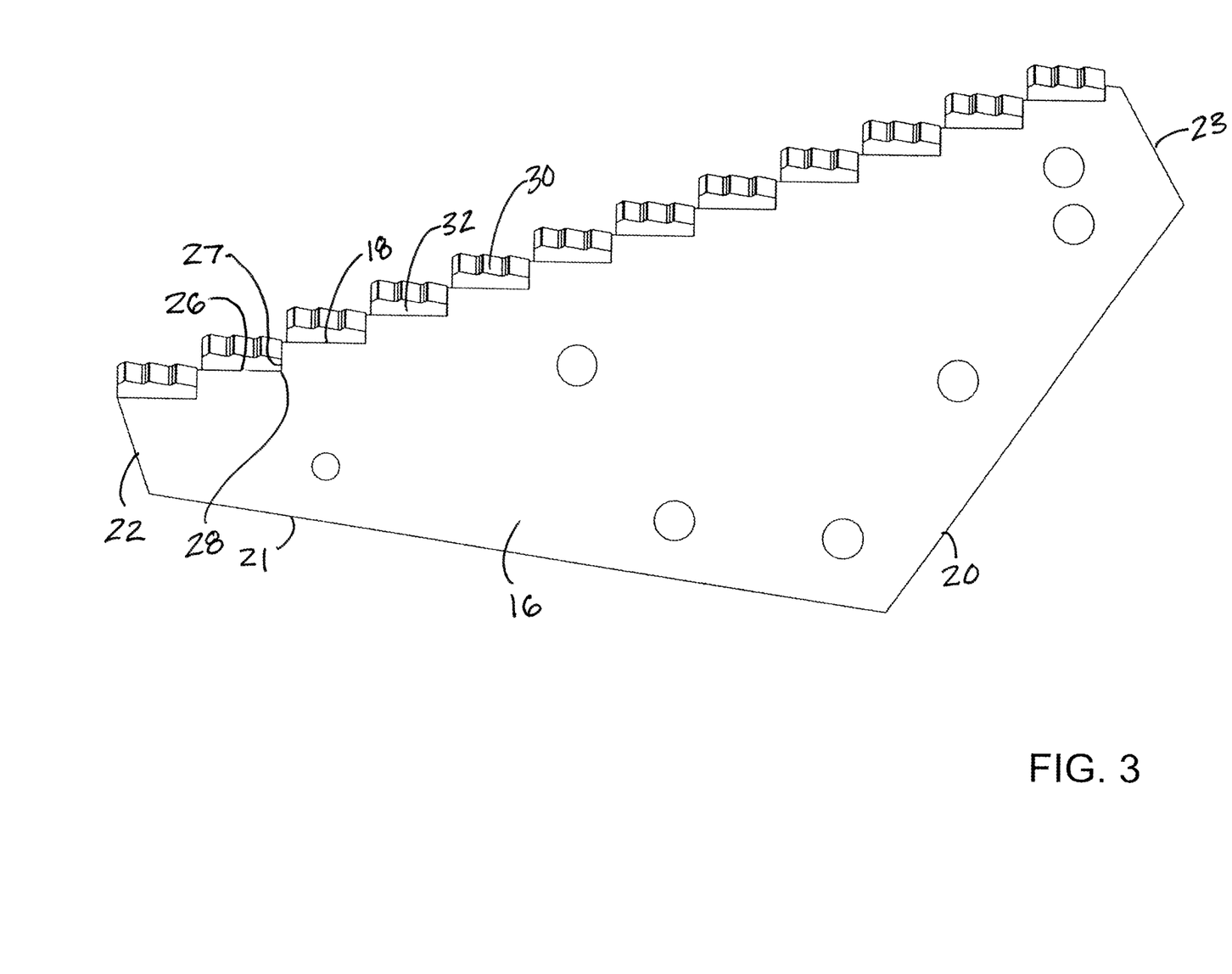
FIG. 3 is a schematic front view of the agricultural knife shown in FIG. 1, according to an illustrative embodiment.
Figure 4:
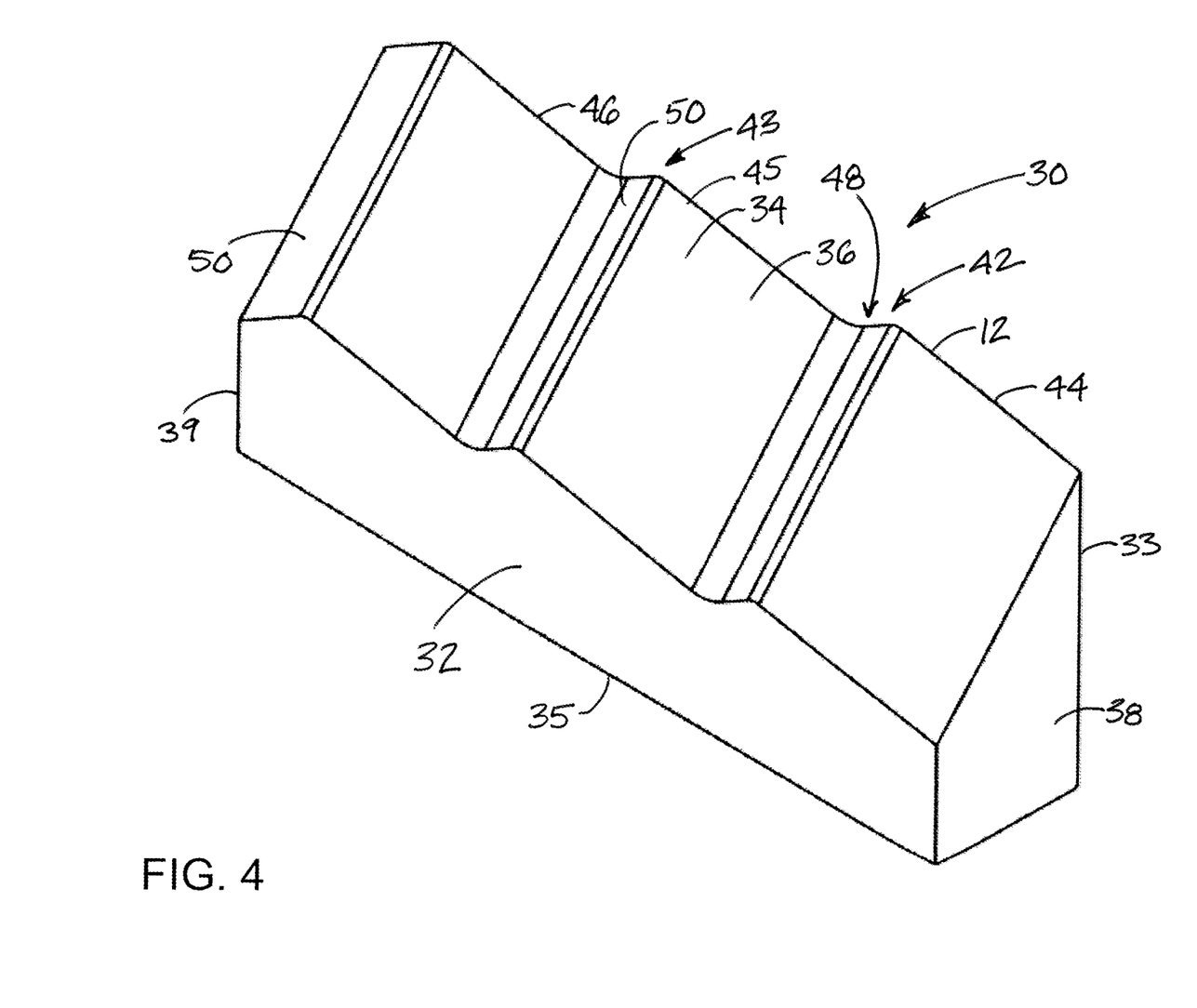
FIG. 4 is a schematic perspective view of a cutting element of the agricultural knife of FIG. 1, according to an illustrative embodiment.
Figure 5:
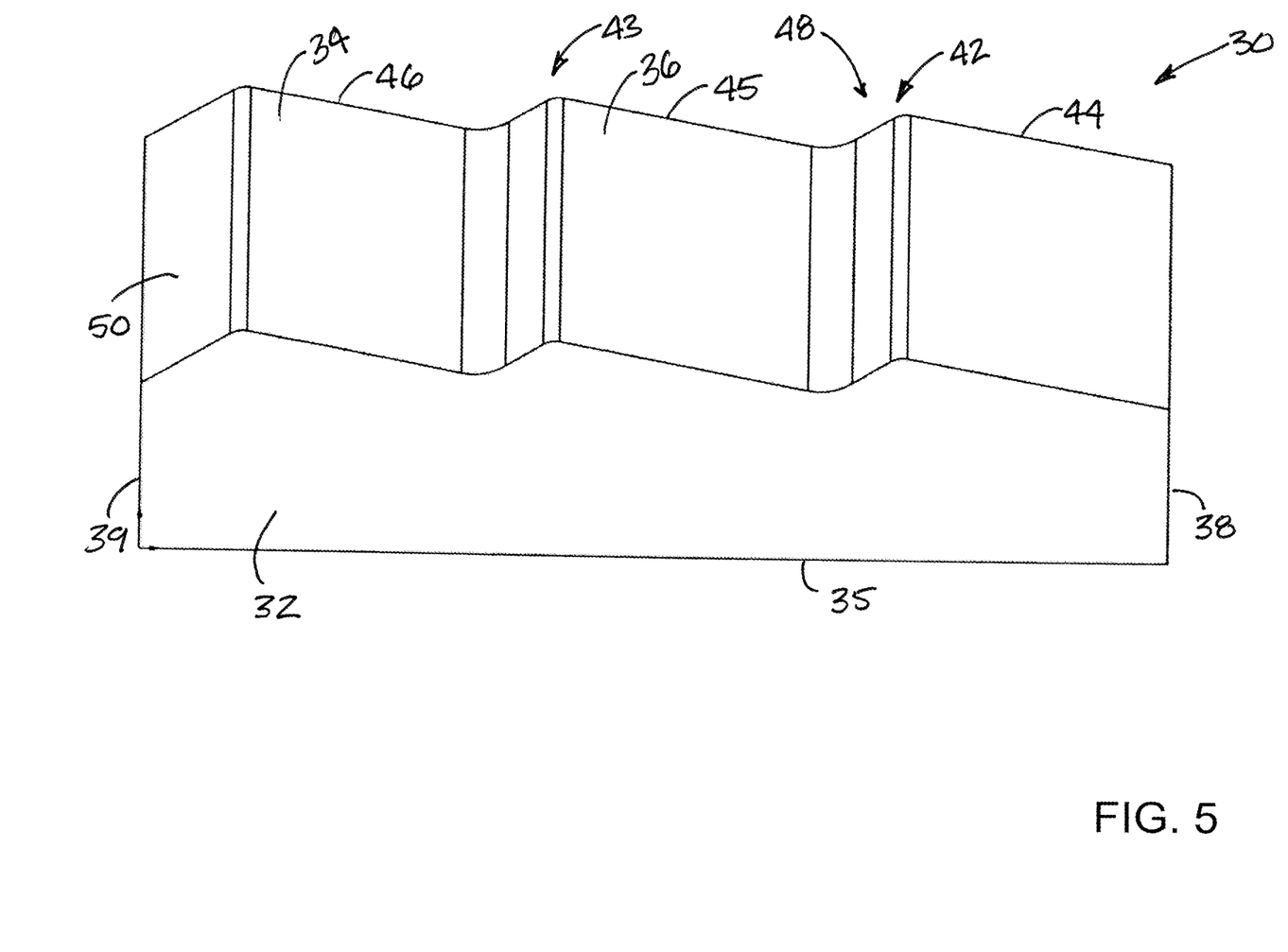
FIG. 5 is a schematic front view of a cutting element of the agricultural knife of FIG. 1, according to an illustrative embodiment.
Figure 6:
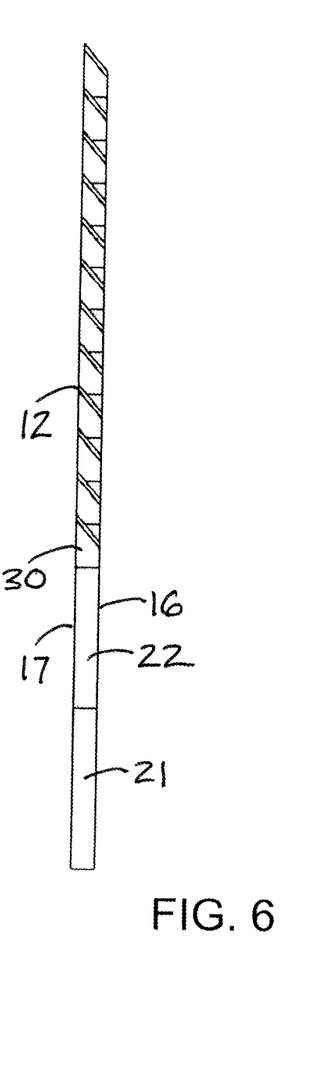
FIG. 6 is a schematic end view of the agricultural knife shown in FIG. 1, according to an illustrative embodiment.

The knife 10 may include a plate 14 which is typically mounted directly on the auger 2 through the use of suitable fasteners, such as threaded bolts and nuts. The plate 14 may have a front face 16 and a rear face 17 with the front face and the rear face being substantially planar and typically oriented substantially parallel to each other such that the plate has a substantially uniform thickness. The plate 14 may have a leading edge 18, a first rear edge 20, and a second rear edge 21, and the first and second rear edges may be located on the plate at substantially opposite locations from the leading edge 18. The plate 14 may also include a pair of end edges 22, 23 which may extend between the leading edge 18 and the respective rear edges 20, 21. In general, the leading edge 18 of the plate may have a general configuration that is substantially straight (as shown in the illustrative embodiments), substantially convex, or substantially saliently angled, but other configurations may also be employed. Additionally, a plurality of fastening holes may be positioned at suitable locations on the plate to receive fasteners passing through the plate as well as the auger 2 of the feed mixer 1 to attach the knife to the auger.

The leading edge 18 of the plate may form a plurality of teeth seats 24 which may be arranged in a stepped contiguous relationship along the leading edge. Each of the teeth seats 24 may include a face edge surface 26 and a back edge surface 27, and the back edge surface of each of the teeth seats may be contiguous with the face edge surface of the adjacent teeth seat of the plurality of teeth seats along the leading edge. The back edge surface 27 of each of the teeth seats may be oriented substantially perpendicular to the face edge surface 26 of the same teeth seat to form a notch 28. The back edge surface 27 of the teeth seat may also be oriented substantially perpendicular to the face edge surface of the adjacent teeth seat in the array of teeth seats. The face edge surface 26 may be substantially planar and lie in a plane that is oriented substantially perpendicular to the front face 16, and also the rear face 17, and the back edge surface may also have a similar relationship with the front and rear faces. In some embodiments, the face edge surface of each teeth seat may have a length that is greater than the length of the back edge surface of the teeth seat. For example, the face edge may be approximately two to approximately four times the length of the back edge surface (measured in a direction parallel to the front face), and illustratively may be approximately three times the length.

The knife 10 may also include a plurality of elongated cutting elements 30, and each of the cutting elements may be affixed to the leading edge of the plate. Each cutting element 30 may be positioned in one of the teeth seats 24 of the plurality of teeth seats formed by the leading edge. Each of the cutting elements 30 may be positioned against the face edge surface 26 of the respective teeth seats, and may be affixed thereto. Each cutting element may also be positioned adjacent to the back edge surface 27 of the respective teeth seat such that an end of the elongated cutting element is positioned in the notch 28 formed by the respective teeth seat.

The cutting elements 30 may have various configurations, and illustratively shown in FIGS. 2 through 8 is a configuration of the cutting elements in which the cutting edge 12 is laterally offset with respect to a longitudinal axis of the cutting element as well as the leading edge 18 of the plate 14. Illustratively shown in FIGS. 9 through 14 is a configuration of the cutting elements in which the cutting edge 12 is substantially laterally centered with respect to the longitudinal axis of the cutting element and the leading edge 18 of the plate 14.

Each of the cutting elements 30 may have a front surface 32 and a rear surface 33 which is located opposite of the front surface. The front surface 32 may be generally aligned with the front face 16 of the plate, and the rear surface 33 may be generally aligned with the rear face 17. Each of the cutting elements may also have a top surface 34 and a bottom surface 35 which is located opposite of the top surface. The bottom surface 35 may be affixed to the face edge surface of the teeth seat on which the element 30 is positioned. The portion of the cutting edge 12 formed by the cutting element may be located on the top surface 34.

In some embodiments, the cutting edge 12 may be located to one side of the top surface 34 and adjacent to either the front surface or the rear surface, such as the rear surface 17 as shown, for example, in the embodiments depicted in FIGS. 2 through 8 of the drawings. In other embodiments, the cutting edge 12 may bisect the top surface 34, such as is shown, for example, in FIGS. 9 through 14 of the drawings.

The top surface 34 in some embodiments may have a first top surface portion 36 located on one side of the cutting edge 12 in embodiments having the cutting edge located at the front 16 or rear 17 surface of the plate (see, e.g., FIGS. 2 through 8), and the first top surface may converge with the rear surface 33 of the element 30 to form the cutting edge section on the element. The top surface 34 may have a second top surface portion 37 located on an opposite side of the cutting edge 12 from the first top surface portion in embodiments in which the cutting edge bisects the top surface (:see, e.g., FIGS. 9 through 14). The first 36 and second 37 top surface portions may converge to form the cutting edge section on the cutting element. The cutting element may also have a pair of opposite end surfaces 38, 39, and one of the end surfaces may abut the back edge surface 27 of the respective teeth seat 24. The bottom surface 35 may be affixed to the face edge surface by, for example, brazing of the bottom surface to the face edge surface 26 of the seat, although other types of affixation may be employed.

Significantly, the serrated cutting edge 12 may have a plurality of primary serrations 40 and a plurality of secondary serrations 42, 43. Between each of the primary serrations 40 may be multiple secondary serrations, and as an example at least two secondary serrations may be positioned between adjacent primary serrations, although additional secondary serrations may be located between primary serrations. At least one of the primary serrations 40 may have a plurality of cutting edge sections 44, 45, 46, and each of the cutting edge sections may correspond to at least one of the secondary serrations. Each of the cutting edge sections 44, 45, 46 may extend in the elongate direction of the cutting element 30 and may extend from one (primary or secondary) serration to another, adjacent (primary or secondary) serration. Each of the cutting edge sections 44, 45, 46 may extend along substantially parallel lines, and these cutting edge sections may lie in substantially the same plane as each other. The lines of the cutting edge sections may be oriented at an oblique angle with respect to the face edge surface and the back edge surface of the teeth seat 24.

Figure 7:
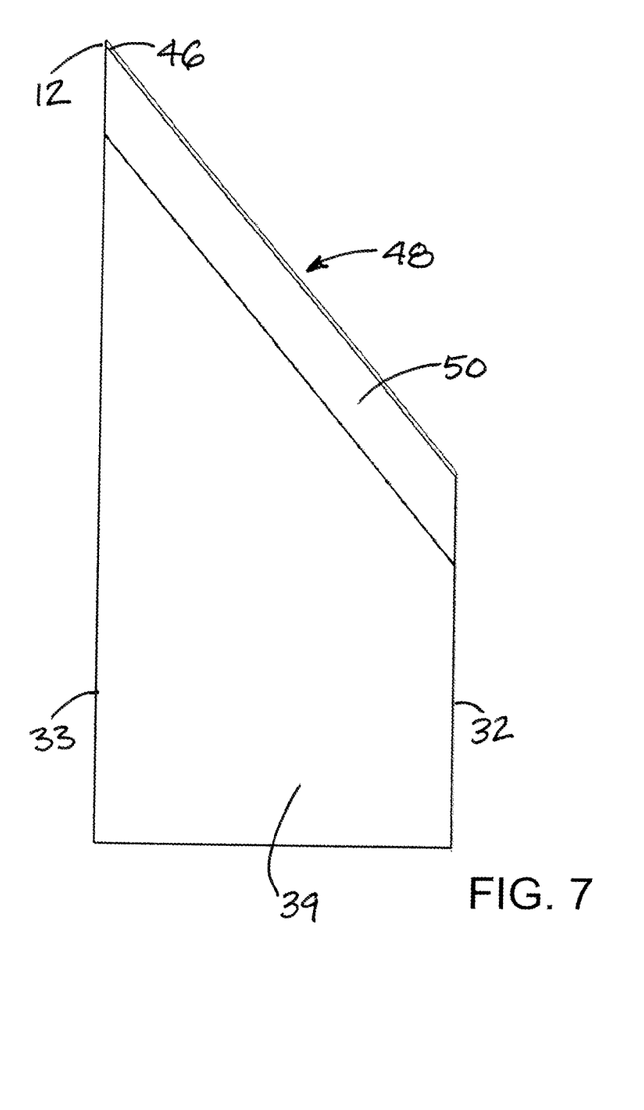
FIG. 7 is a schematic perspective view of a cutting element of the agricultural knife of FIG. 1, according to an illustrative embodiment.
Figure 8:
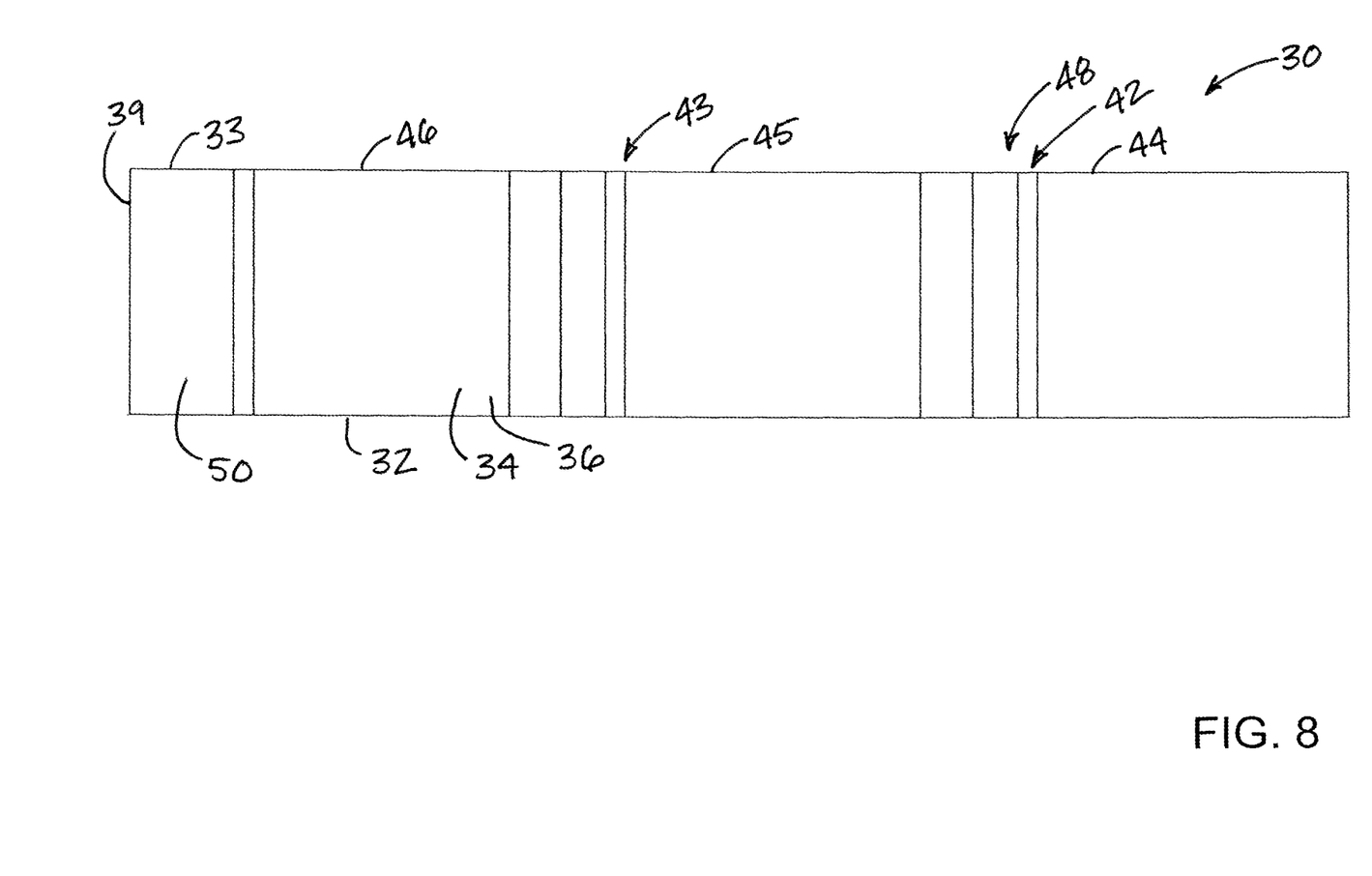
FIG. 8 is a schematic top view of a cutting element of the agricultural knife of FIG. 1, according to an illustrative embodiment.
Figure 9:
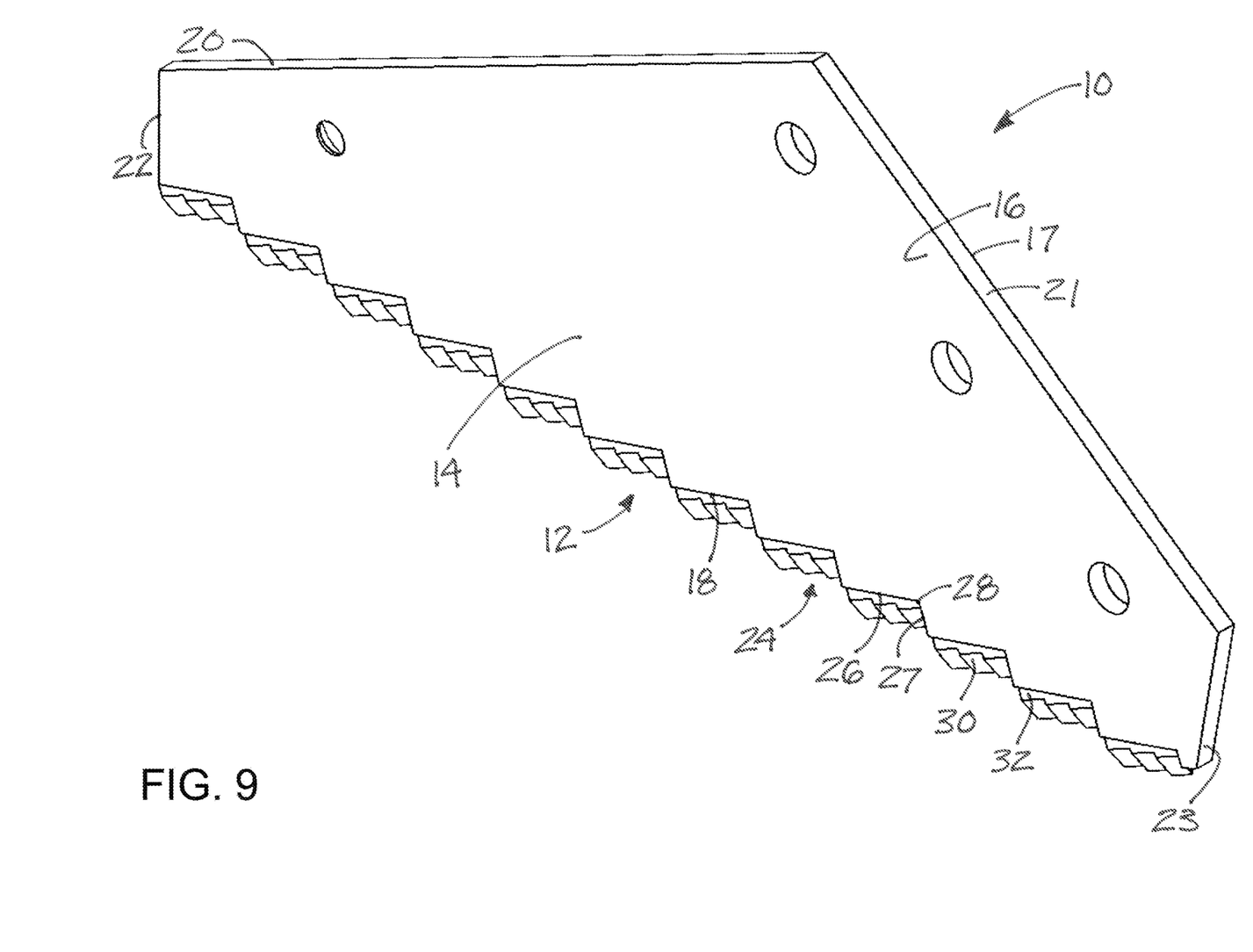
FIG. 9 is a schematic perspective view of another embodiment of the agricultural knife.
Figure 10:
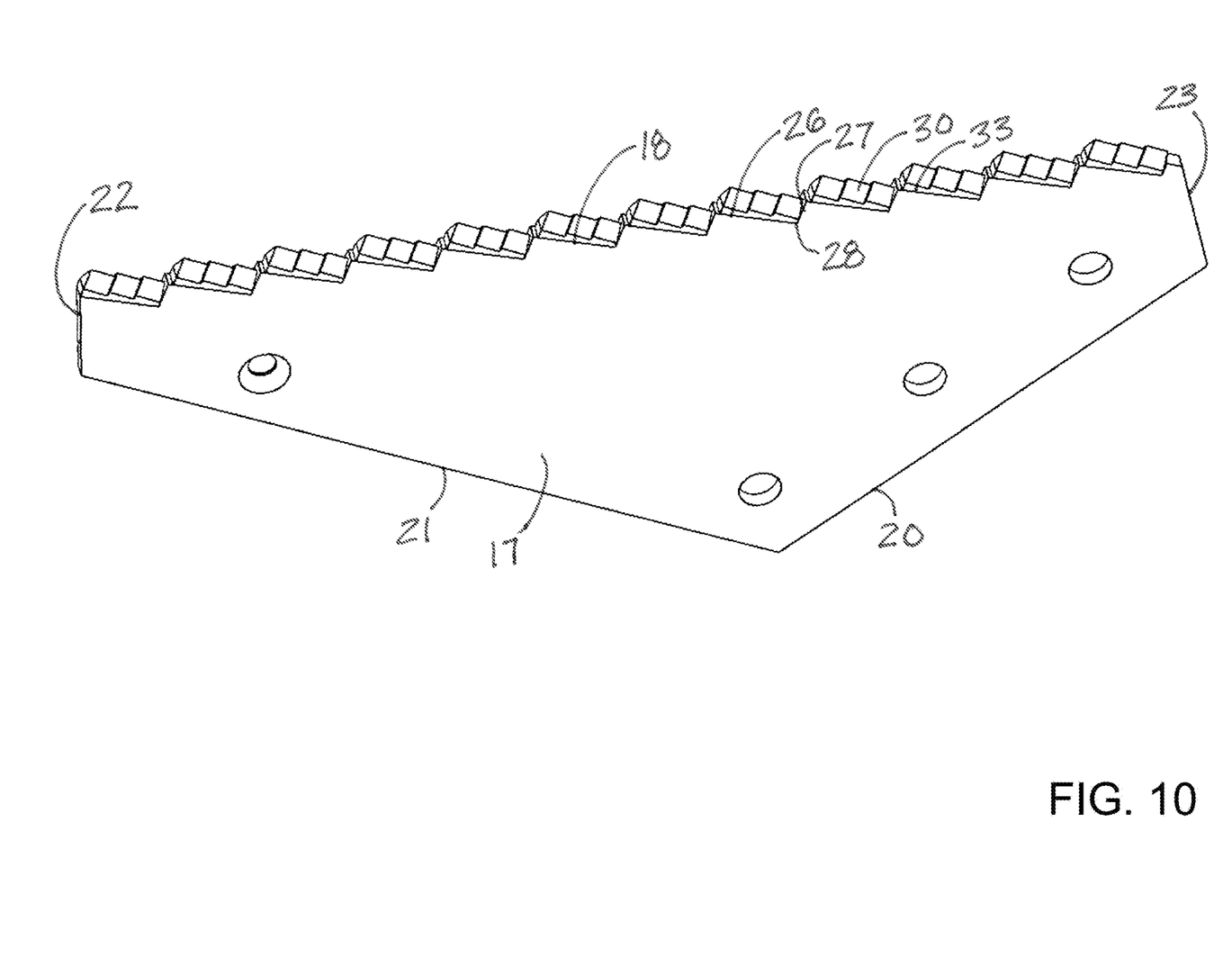
FIG. 10 is a schematic reverse perspective view of the agricultural knife shown in FIG. 9, according to an illustrative embodiment.
Figure 11:
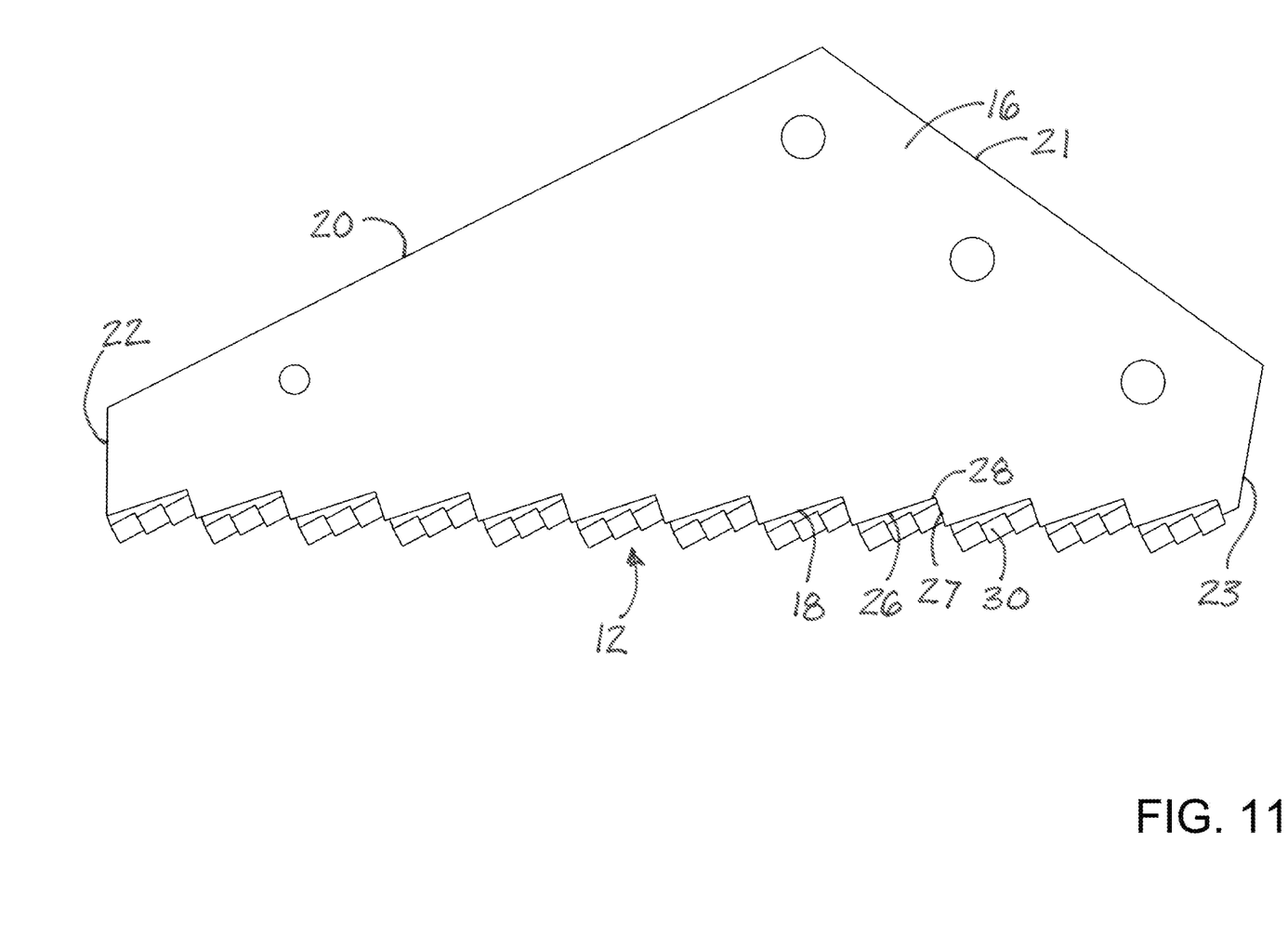
FIG. 11 is a schematic front view of the agricultural knife shown in FIG. 9, according to an illustrative embodiment.
Figure 12:
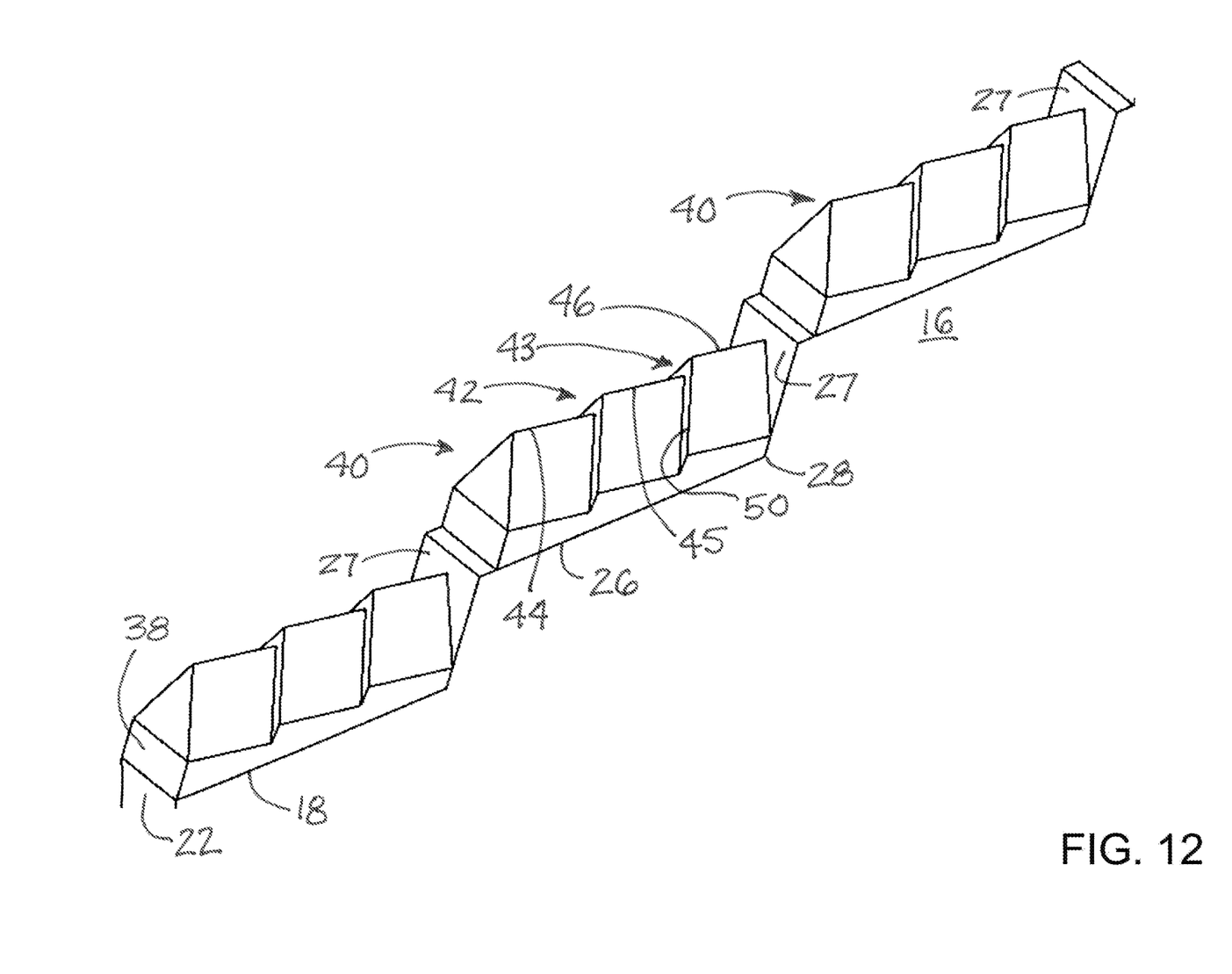
FIG. 12 is a schematic perspective view of a portion of the plate and a plurality of the cutting elements of the agricultural knife of FIG. 9, according to an illustrative embodiment.
Figure 13:
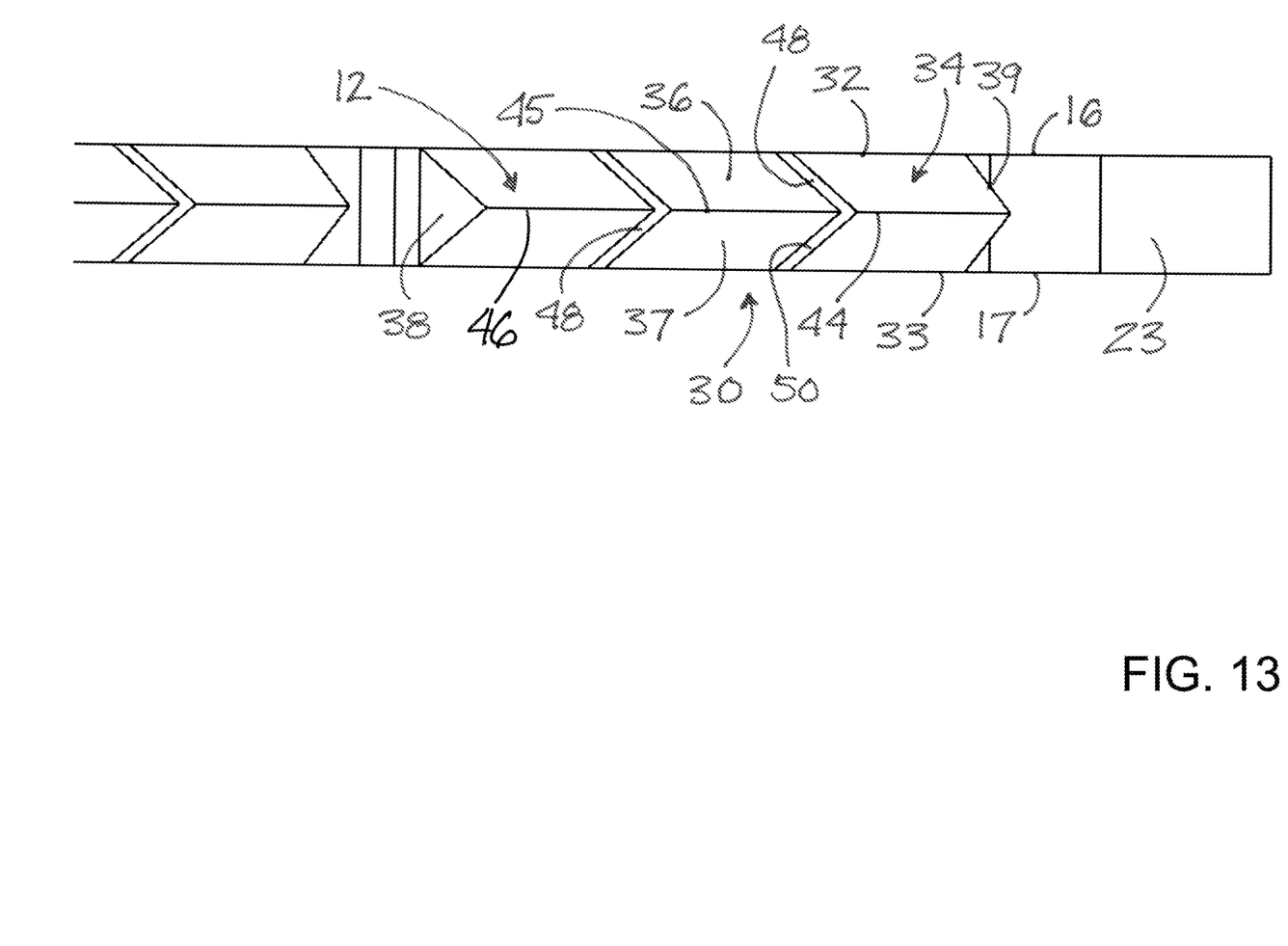
FIG. 13 is a schematic edge view of a portion of the agricultural knife of FIG. 9, according to an illustrative embodiment.
Figure 14:
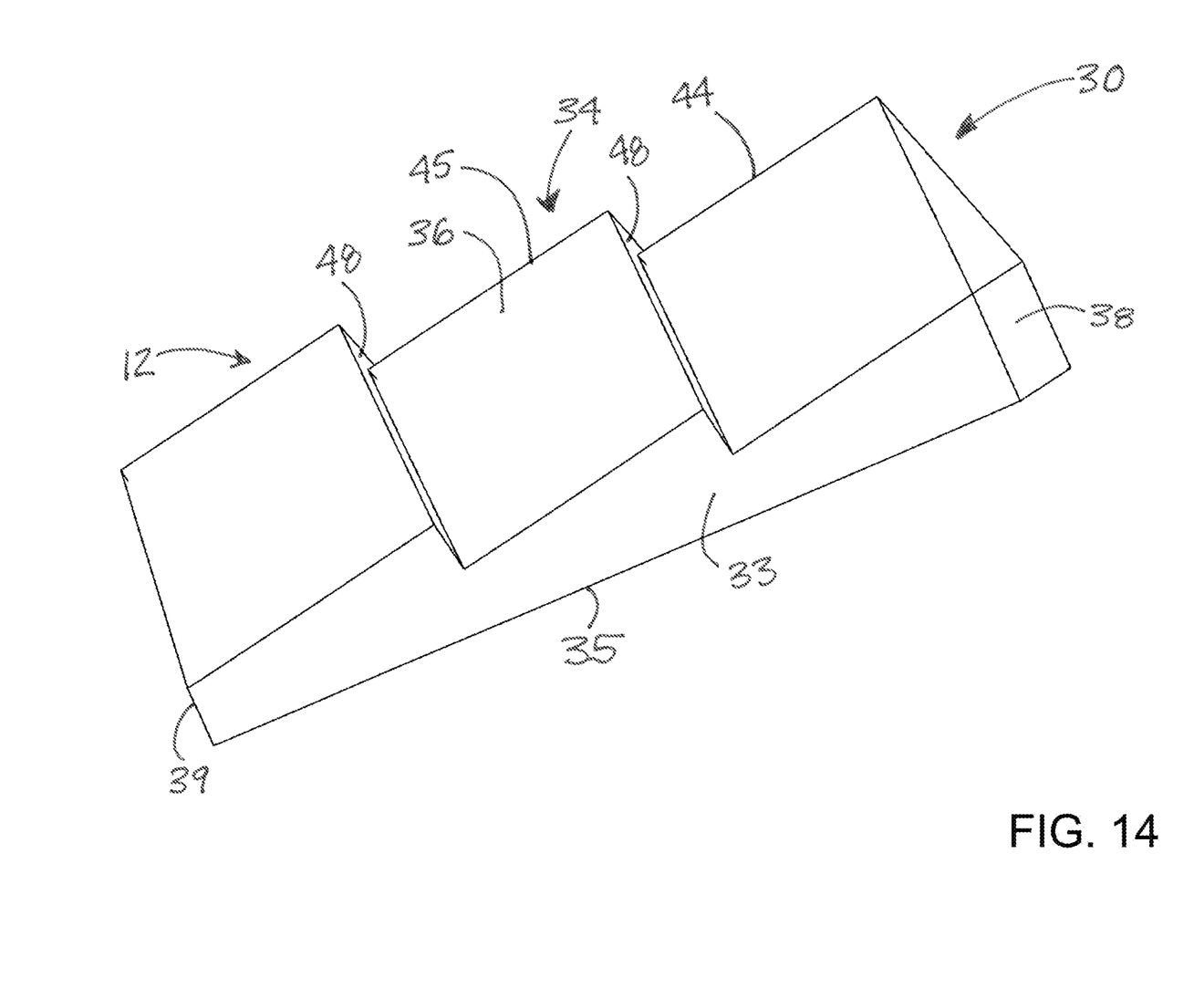
FIG. 14 is a schematic perspective view of a cutting element of the agricultural knife of FIG. 9, according to an illustrative embodiment.

Each of the cutting elements 30 may thus form one of the primary serrations of the cutting edge, and additionally, each of the cutting elements 30 may form at least one of the secondary serrations. In some embodiments, each cutting element may form one of the primary serrations and at least two of the secondary serrations, and the secondary serrations may be located between the primary serration formed by one cutting element and the primary serration formed by an adjacent cutting element on the leading edge. A ridge 48 may be formed on the top surface 34 of the cutting element to form one of the secondary serrations on the cutting element. The ridge 48 may separate one cutting edge section from another cutting edge section, and may extend substantially perpendicular to the cutting edge section. The lines of the cutting edge sections 44, 45, 46 may thus be offset from each other by the ridge 48 and the cutting edge sections may be distinguished and otherwise separated from each other by the secondary serrations 42, 43. The ridge 48 may extend between the front and rear surfaces of the cutting element, and may extend from the front surface to the rear surface. A ridge face 50 may be formed by the ridge and may extend substantially perpendicular to the first and second top surface portions. In some embodiments, the ridge face 50 may have a shape which is substantially trapezoidal, such as shown in FIG. 7, and in other embodiments the ridge face 50 may have a shape which is substantially chevron or V-shaped such as shown in FIGS. 12 and 13 of the drawings.

The primary serrations may be substantially larger that the secondary serrations, with the interruptions or offsets in the cutting edge at the primary serrations being substantially greater than the offsets in the cutting edge at the secondary serrations. Thus, the offset in the line of the cutting edge at the end of one of the cutting elements (corresponding to one of the primary serrations) may be many times the offset in the line of the cutting edge at one of the ridges (corresponding to one of the secondary serrations). For example, the magnitude of the offset at the primary serrations may be approximately five to approximately ten or more times the magnitude of the offset at the secondary serrations.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A knife with a serrated cutting edge for use on an auger of an agricultural feed mixer, the knife comprising:

a plate having opposite faces with at least one of the faces defining a face plane, the plate having at least a leading edge forming a plurality of teeth seats arranged in a stepped configuration along the leading edge, each of the plurality of teeth seats including a face edge surface and a back edge surface converging to form a notch; and a plurality of elongate cutting elements, each of the cutting elements being affixed to one of the teeth seats formed by the leading edge, each of the cutting elements having a cutting edge forming a portion of the serrated cutting edge such that the cutting edges on the plurality of cutting elements collectively form the serrated cutting edge, each of the cutting elements having a top surface and a bottom surface opposite of the top surface, the cutting edge of each of the cutting elements being located on the top surface, the bottom surface of each cutting element being affixed to one of the teeth seats of the leading edge of the plate;

wherein the serrated cutting edge has a plurality of primary serrations and a plurality of secondary serrations, each of the cutting elements forming at least one of the primary serrations and at least two of the secondary serrations;

wherein the cutting edge of each of the cutting elements has a plurality of cutting edge sections positioned between adjacent secondary serrations or between adjacent primary and secondary serrations;

wherein each of the cutting edge sections of the cutting edge lies in a common edge plane and each of the cutting edge sections is offset from adjacent cutting edge sections in the common edge plane, the common edge plane being oriented substantially parallel to the face plane of the plate.

2. The knife of claim 1 wherein each of the cutting elements forms at least two of the secondary serrations between adjacent said primary serrations.

3. The knife of claim 1 wherein each of the cutting elements has at least two of the secondary serrations with at least three of the cutting edge sections.

4. The knife of claim 1 wherein the cutting edge sections of the cutting edge of the cutting element extend along substantially parallel lines.

5. The knife of claim 1 wherein a ridge forms each of the secondary serrations on a cutting element of the plurality of cutting elements, and each of the ridges has a ridge face, each of the ridge faces lying in planes orientated substantially perpendicular to the face plane.

6. The knife of claim 1 wherein a ridge forms each of the secondary serrations on a cutting element of the plurality of cutting elements.

7. The knife of claim 6 wherein the ridge of the secondary serration separates one cutting edge section from another cutting edge section of the cutting edge of the cutting element.

8. The knife of claim 6 wherein the ridge of the secondary serration has a ridge face with a substantially trapezoidal shape.

9. The knife of claim 6 wherein the ridge of the secondary serration has a ridge face with a substantially chevron shape.

10. The knife of claim 6 wherein a cutting element of the plurality of cutting elements has a length generally equal to that of a said face edge surface of a corresponding said teeth seat.

11. The knife of claim 1 wherein the cutting elements are formed of a cemented carbide material.

12. The knife of claim 11 wherein each of the cutting elements is attached to one of the teeth seats of the plate by brazing.

13. The knife of claim 1 wherein one end surface of a pair of opposite end surfaces of the cutting element abuts against the back edge surface of a respective teeth seat.

14. The knife of claim 1 wherein a magnitude of the offset between cutting edge sections of the cutting edge of the cutting element on opposite sides of a said primary serration is greater than a magnitude of the offset between cutting edge sections of the cutting edge of the cutting element on opposite sides of a said secondary serration.

15. The knife of claim 1 wherein each of the cutting elements has a substantially triangular profile in a plane oriented substantially perpendicular to the face plane of the plate.

16. The knife of claim 1 wherein each of the cutting elements has a substantially trapezoidal profile in a plane oriented substantially perpendicular to the face plane of the plate.

17. The knife of claim 1 wherein the cutting edge on a cutting element of the plurality of cutting elements bisects the top surface of the cutting element such that a first top surface portion is located on one side of the cutting edge and a second top surface portion is located on an opposite side of the cutting edge, the first and second top surface portions converging together at the cutting edge of the cutting element.

* * * * *